US010430312B2

(12) United States Patent
Cui et al.

(10) Patent No.: US 10,430,312 B2
(45) Date of Patent: Oct. 1, 2019

(54) METHOD AND DEVICE FOR DETERMINING PROGRAM PERFORMANCE INTERFERENCE MODEL

(71) Applicant: Huawei Technologies Co., Ltd., Shenzhen, Guangdong (CN)

(72) Inventors: Huimin Cui, Beijing (CN); Jiacheng Zhao, Beijing (CN); Xiaobing Feng, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 565 days.

(21) Appl. No.: 15/066,526

(22) Filed: Mar. 10, 2016

(65) Prior Publication Data

US 2016/0188434 A1     Jun. 30, 2016

Related U.S. Application Data

(63) Continuation of application No. PCT/CN2014/086176, filed on Sep. 10, 2014.

(30) Foreign Application Priority Data

Sep. 10, 2013 (CN) .......................... 2013 1 0410943

(51) Int. Cl.
    *G06F 11/34*      (2006.01)

(52) U.S. Cl.
    CPC ...... *G06F 11/3457* (2013.01); *G06F 11/3433* (2013.01); *G06F 11/3452* (2013.01); *G06F 2201/865* (2013.01)

(58) Field of Classification Search
    CPC ............. G06F 11/3457; G06F 11/3433; G06F 11/3452; G06F 2201/865

(Continued)

(56) References Cited

U.S. PATENT DOCUMENTS 7,925,874 B1    4/2011    Zaitsev
2005/0013705 A1    1/2005    Farkas et al.
(Continued)

FOREIGN PATENT DOCUMENTS

CN      101008923 A      8/2007
CN      101286986 A     10/2008
(Continued)

OTHER PUBLICATIONS

Alexandre Kandalintsev et. al., A Behavioral First Order CPU Performance Model for Clouds' Management, IV International Congress on Ultra Modern Telecommunications and Control Systems 2012, pp. 40-48 (Year: 2012).*

(Continued)

*Primary Examiner* — Rehana Perveen
*Assistant Examiner* — Justin C Mikowski
(74) *Attorney, Agent, or Firm* — Womble Bond Dickinson (US) LLP (57) ABSTRACT

A method and a device for determining a program performance interference model is described. The method includes: selecting programs from a determined sample program set to form multiple subsets; acquiring a value of performance interference imposed on each program in each subset and a total occupancy rate of a shared resource occupied by all the programs in each subset; dividing all the subsets into multiple analytical units; performing a regression analysis on the value of performance interference on each sample program included in each analytical unit and a total occupancy rate corresponding to a subset in which the sample program is loaded, and acquiring a target function model; acquiring a performance interference model corresponding to a target program according to the target function model. The performance interference model may be used for preventing another program whose mutual interference is relatively strong from running together with the target program.

12 Claims, 5 Drawing Sheets

(58) Field of Classification Search
USPC .......................................................... 703/22
See application file for complete search history.

(56) References Cited

U.S. PATENT DOCUMENTS

| 2008/0134184 A1 | 6/2008 | Fedorova |
| 2009/0049431 A1 | 2/2009 | Wang et al. |
| 2010/0095300 A1 | 4/2010 | West et al. |
| 2011/0231857 A1 | 9/2011 | Zaroo et al. |

FOREIGN PATENT DOCUMENTS

| CN | 101369233 A | 2/2009 |
| CN | 101894048 A | 11/2010 |
| CN | 102081551 A | 6/2011 |
| CN | 103902443 A | 7/2014 |

OTHER PUBLICATIONS

Benjamin C. Lee, et. al., CPR: Composable Performance Regression for Scalable Multiprocessor Models, 2008 IEEE, 270-281 (Year: 2008).*

Melanie Kambadur, et. al., Measuring Interference Between Live Datacenter Applications, SC12, Nov. 10-16, 2012, Salt Lake City, Utah, USA, p. 1-12 (Year: 2012).*

Amit Kumar Singh et. al., Mapping on Multi/Many-core Systems: Survey of Current and Emerging Trends, DAC'13 May 29-Jun. 7 2013, Austin, TX, USA., 1-10. (Year: 2013).*

Chin-Hao Chang, Sampling-Based Phase Classification and Prediction for Multi-threaded Program Execution on Multi-core Architectures, 2013 42nd International Conference on Parallel Processing, 349-358. (Year: 2013).*

Yuejian Xie et. al., PIPP: Promotion/Insertion Pseudo-Partitioning of Multi-Core Shared Caches, ISCA'09, Jun. 20-24, 2009, Austin, Texas, USA., p. 174-183. (Year: 2009).*

Kristen R. Walcott, et. al., Dynamic Prediction of Architectural Vulnerability from Microarchitectural State, ISCA'07, Jun. 9-13, 2007, San Diego, California, USA, 516-527. (Year: 2007).*

* cited by examiner

METHOD AND DEVICE FOR DETERMINING PROGRAM PERFORMANCE INTERFERENCE MODEL

CROSS-REFERENCE TO RELATED APPLICATIONS

This application is a continuation of International Application No. PCT/CN2014/086176, filed on Sep. 10, 2014, which claims priority to Chinese Patent Application No. 201310410943.7, filed on Sep. 10, 2013, both of which are hereby incorporated by reference in their entireties.

TECHNICAL FIELD

The present disclosure relates to the field of multi-core processors, and in particular, to a method and a device for determining a program performance interference model.

BACKGROUND

Along with the technological development, people's demand for CPU performance becomes increasingly strong. However, because of increased frequency, power consumption increases more seriously. Therefore, an on-chip multi-core processor architecture is more widely used.

The on-chip multi-core processor architecture refers that multiple processor cores are integrated in one processor chip to achieve a good combination of power consumption and performance.

During a process of researching and developing the present disclosure, the inventors have found that, in the on-chip multi-core processor architecture, processor cores in a processor are not completely independent, and need to share various kinds of processor resources. Therefore, when computing kernels are running programs, performance interference is caused between different programs. For example, when a program with a relatively high priority needs to use a shared resource in the multi-core processor during a running process, another program is also using the shared resource at a same time, which affects performance of the program with a relatively high priority.

SUMMARY

In view of this, an objective of embodiments of the present disclosure is to provide a method and a device for determining a program performance interference model to resolve the foregoing problem.

To achieve the foregoing objective, the embodiments of the present disclosure provide the following technical solutions:

According to a first aspect of the embodiments, a method for determining a program performance interference model is provided, where the method is applied to a multi-core processor and includes:

determining a sample program set, where the sample program set includes multiple sample programs used for sample training;

extracting multiple subsets from the sample program set according to a preset extraction rule, where union of the multiple subsets is the sample program set;

acquiring a value of performance interference imposed on each sample program in each subset when the sample program is running in the multi-core processor, and a total occupancy rate of a shared resource in the multi-core processor occupied by all the sample programs in each subset;

dividing all the subsets into multiple analytical units, where each analytical unit includes multiple subsets;

performing a regression analysis, according to multiple function models in a preset function library, on the value of performance interference on each sample program included in each analytical unit and a total occupancy rate corresponding to a subset in which the sample program is located; and acquiring a target function model from the multiple function models; and determining a performance interference model corresponding to a target program according to the target function model, where the target program is any program running in the multi-core processor.

With reference to the first aspect, in a first possible implementation manner, the determining a sample program set includes:

determining a characteristic vector of each application program in an application program database corresponding to the multi-core processor, where the characteristic vector represents an occupancy rate of each shared resource in the multi-core processor occupied by the application program when the application program is running alone in the multi-core processor;

classifying application programs whose occupancy rates are in a same preset occupancy rate interval into a same characteristic group; and randomly selecting one application program from each characteristic group as a sample program to form the sample program set.

With reference to the first aspect, in a second possible implementation manner, the extracting multiple subsets from the sample program set according to a preset extraction rule includes:

separately using each sample program in the sample program set as a target sample program; and extracting, from the sample program set, Q different subsets that include the target sample programs, where each subset includes N sample programs in total;

where:

N is a quantity of processor cores integrated in the multi-core processor; and $2 \le Q \le C_{M-1}^{N-1}$, where Q is an integer, and M is a quantity of sample programs in the sample program set.

With reference to the second possible implementation manner of the first aspect, in a third possible implementation manner, the dividing all the subsets into multiple analytical units includes:

determining an occupancy rate interval corresponding to all the acquired total occupancy rates, and dividing the occupancy rate interval according to a preset dividing rule to obtain multiple occupancy rate sub-intervals; and allocating each subset to an occupancy rate sub-interval to which a total occupancy rate corresponding to the subset belongs, where all subsets in each occupancy rate sub-interval are considered as an analytical unit.

With reference to the first aspect, in a fourth possible implementation manner, the determining a performance interference model corresponding to a target program according to the target function model includes:

acquiring a value of performance interference imposed on the target program when the target program is running in the multi-core processor, and a total occupancy rate of a shared resource occupied by all programs that are currently running in the multi-core processor;

substituting the value of performance interference and the total occupancy rate into the target function model to obtain coefficients of all variables in the target function model; and determining the performance interference model corresponding to the target program according to the coefficients of all the variables.

According to a second aspect of the embodiments, a device for determining a program performance interference model is provided, where the device is applied to a multi-core processor and includes:

a first determining unit, configured to determine a sample program set, where the sample program set includes multiple sample programs used for sample training;

an extracting unit, configured to extract multiple subsets from the sample program set according to a preset extraction rule, where union of the multiple subsets is the sample program set;

an acquiring unit, configured to acquire a value of performance interference imposed on each sample program in each subset when the sample program is running in the multi-core processor, and a total occupancy rate of a shared resource in the multi-core processor occupied by all the sample programs in each subset;

a dividing unit, configured to divide all the subsets into multiple analytical units, where each analytical unit includes multiple subsets;

an analyzing unit, configured to perform a regression analysis, according to multiple function models in a preset function library, on the value of performance interference on each sample program included in each analytical unit and a total occupancy rate corresponding to the value of performance interference; and acquire a target function model from the multiple function models; and a second determining unit, configured to determine a performance interference model corresponding to a target program according to the target function model, where the target program is any program running in the multi-core processor.

With reference to the second aspect, in a first possible implementation manner, the first determining unit includes:

a first determining subunit, configured to determine a characteristic vector of each application program in an application program database corresponding to the multi-core processor, where the characteristic vector represents an occupancy rate of each shared resource in the multi-core processor occupied by the application program when the application program is running alone in the multi-core processor;

a classifying subunit, configured to classify application programs whose occupancy rates are in a same preset occupancy rate interval into a same characteristic group; and a selecting subunit, configured to randomly select one application program from each characteristic group as a sample program to form a sample program set.

With reference to the first implementation manner of the second aspect, in a second possible implementation manner, the dividing unit includes:

a dividing subunit, configured to determine an occupancy rate interval corresponding to all the acquired total occupancy rates, and divide the occupancy rate interval according to a preset dividing rule to obtain multiple occupancy rate sub-intervals; and an allocating subunit, configured to allocate each subset to an occupancy rate sub-interval to which a total occupancy rate corresponding to the subset belongs, where all subsets in each occupancy rate sub-interval are considered as an analytical unit.

With reference to the second aspect, in a third possible implementation manner, the second determining unit includes:

an acquiring subunit, configured to acquire a value of performance interference imposed on the target program when the target program is running in the multi-core processor, and a total occupancy rate of a shared resource occupied by all programs that are currently running in the multi-core processor;

a substituting subunit, configured to substitute the value of performance interference and the total occupancy rate into the target function model to obtain coefficients of all variables in the target function model; and a second determining subunit, configured to determine the value of performance interference corresponding to the target program according to the coefficients of all the variables.

It can be seen from the technical solutions provided in the foregoing embodiments of the present application that, in the embodiments of the present disclosure, different sample programs are selected to form multiple subsets, and a value of performance interference imposed on each sample program in each subset when the sample program is running in a multi-core processor and a total occupancy rate of a shared resource occupied by all the sample programs in each subset are acquired; all the subsets are divided into multiple analytical units, a regression analysis is performed, according to multiple function models in a preset function library, on the value of performance interference on each sample program included in each analytical unit and a total occupancy rate corresponding to a subset in which the sample program is located, so as to obtain a function model corresponding to each sample program; and a target function model is acquired from the obtained function models corresponding to all the sample programs; and a performance interference model corresponding to a target program is determined according to the target function model.

For the performance interference model according to the embodiments of the present disclosure, the finally determined performance interference model is obtained by performing a regression analysis on a value of performance interference imposed on a program and a total occupancy rate of a shared resource occupied by a subnet in which the program is located. The performance interference model reflects a correspondence between a value of performance interference imposed on a program and a total occupancy rate of a shared resource. In terms of the performance interference model according to the embodiments of the present disclosure, for programs that are running together in a multi-core processor, a value of performance interference imposed on each program can be determined provided that a total pressure that is currently imposed, by all programs, on each shared resource in the multi-core processor is determined.

According to the performance interference model provided in the embodiments of the present disclosure, a process of determining a value of performance interference imposed on a program is not limited by data of a program running in a multi-core processor; a value of performance interference on each program can be determined provided that a total occupancy rate of each shared resource in the multi-core processor occupied by all programs is determined, thereby providing a reference standard for the programs that are running together; during a specific running process, programs may be scheduled according to the value of performance interference on each program, thereby improving a resource utilization rate of the multi-core processor and ensuring normal running of each program.

In summary, by using the method for determining a program performance interference model according to the embodiments of the present disclosure, a performance interference model can be provided for each program running in a multi-core processor, and performance interference imposed, by another program, on each program running in the multi-core processor can be quantized, thereby providing a scheduling basis for preventing programs whose mutual interference is relatively strong from running in a same multi-core processor, and ensuring optimal performance of a program when the program is running in the multi-core processor.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments recorded in the present application, and persons of ordinary skill in the art may still derive other drawings from these accompanying drawings without creative efforts.

DESCRIPTION OF EMBODIMENTS

To make persons skilled in the art understand the technical solutions in the present application better, the following clearly describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application shall fall within the protection scope of the present application.

As people's demand for CPU performance becomes increasingly strong, an on-chip multi-core processor architecture has been widely used. The on-chip multi-core processor architecture refers that multiple processor cores are integrated in one processor chip. In the on-chip multi-core processor architecture, processor cores in a multi-core processor are not completely independent, and the processor cores share various kinds of processor resources, for example, a last-level cache and a memory controller of a processor. This kind of resource sharing may have a serious impact on performance of programs that are running simultaneously in a same multi-core processor.

Programs that are running simultaneously in a multi-core processor may contend for a same shared resource. Therefore, when the programs are running together in the multi-core processor, some programs may have a stronger competitive capacity for a shared resource and occupy a larger proportion of the shared resource. Consequently, another program cannot effectively utilize the shared resource and is subject to more severe performance interference. For example, when a program with a higher QoS (Quality of Service) priority and a program with a lower priority run together, the two contend for a shared resource for a long time, so that the program with a higher QoS priority cannot run preferentially, which reduces performance of the program.

In addition, to address the foregoing problem and ensure perform of a program with a high QoS, in existing program scheduling in a multi-core processor, the program with a high QoS priority is generally prohibited from running together with another program, which results in a relatively low hardware resource utilization rate, and significance of multiple cores in the multi-core processor is lost.

Therefore, to resolve the foregoing problem, after several times of practical research, development, and implementation, the inventors have found that a function mapping relationship exists between a value of performance interference imposed on any program running in a multi-core processor and a total occupancy rate of a shared resource in the multi-core processor.

The embodiments of the present disclosure provide a method for determining a program performance interference model. The method is divided into two implementation stages: Based on a characteristic of a running program, it is proposed that a model of inter-core performance interference imposed on any program may be represented by a piecewise function of a total pressure imposed on each shared resource in the multi-core processor; and a specific performance interference model is provided for each program running in the multi-core processor, so that when any program and another program are running together in the multi-core processor, performance interference imposed on the program by the another program can be quantized. This may prevent programs whose mutual interference is relatively strong from running in a same multi-core processor, and provides an instruction for mutual scheduling between programs that may run together, thereby improving a resource utilization rate of the multi-core processor.

In the embodiments of the present disclosure, the characteristic of a running program refers to a behavior characteristic of the program on each shared resource in a multi-core processor during a running process; and the behavior characteristic may be considered as a pressure imposed by the program on the shared resource. In the embodiments of the present disclosure, the pressure is represented by an occupancy rate of a shared resource occupied by a program. In an existing on-chip multi-core processor architecture, shared resources included in a multi-core processor include a shared cache, a shared data pre-fetcher, shared memory bandwidth, and the like.

In the embodiments of the present disclosure, a model of inter-core performance interference imposed on any program may be represented by a piecewise function of a total pressure imposed, by running programs, on shared resources in the multi-core processor; a representative formula of the model is as follows:

$$PDA=fA(Aggregate(P1),Aggregate(P2), \ldots Aggregate(Pi), \ldots Aggregate(Pk)), \text{ where:}$$

PDA indicates inter-core performance interference imposed on any program A by another program that is running together with program A; fA is a piecewise function for program A, and a quantity of independent variables of fA is a quantity k of shared resources in the multi-core processor; Aggregate (Pi) (i=1, 2, 3, . . . k) is an aggregated total occupancy rate of resource i occupied by all programs that are running together and is an independent variable of the function fA.

Figure 1:
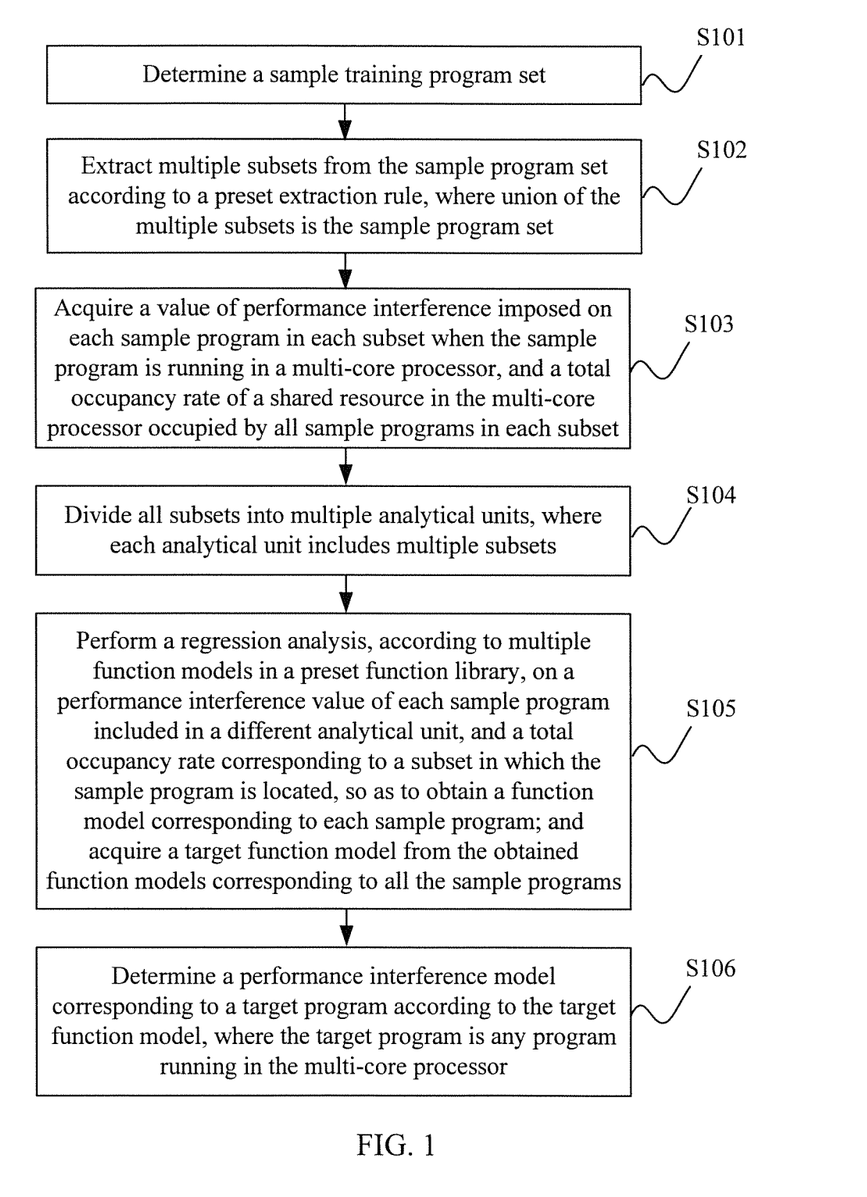
FIG. 1 is a method flowchart of a method for determining a program performance interference model according to an embodiment of the present disclosure.

The method for determining a performance interference model introduced in the embodiments of the present disclosure is a process for determining PDA. Specific implementation of the method is as follows:

FIG. 1 is a method flowchart of a method for determining a program performance interference model according to an embodiment of the present disclosure. The method for determining a program performance interference model according to this embodiment of the present disclosure may be executed by any multi-core processor, where multiple processor cores are integrated in the multi-core processor. As shown in FIG. 1, the method includes:

Step S101: Determine a sample program set, where the sample program set includes multiple sample programs used for sample training.

To ensure that a performance interference model that is finally determined by using the method for determining a performance interference model in this embodiment of the present disclosure is applicable to all application programs that may run in the multi-core processor, a set of sample training programs that may run in the multi-core processor is first determined in this embodiment of the present disclosure.

Figure 2:
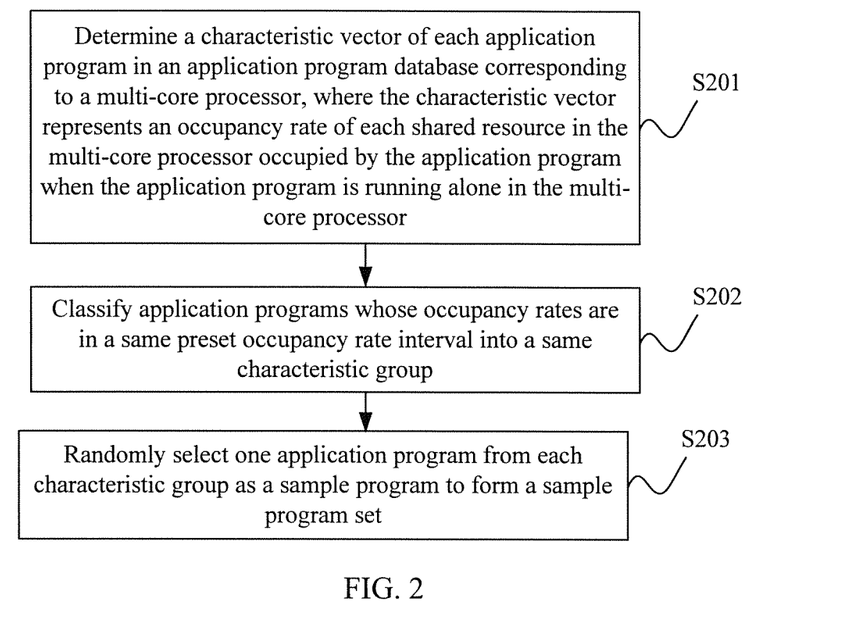
FIG. 2 is a specific method flowchart of a method for determining a program performance interference model according to an embodiment of the present disclosure.

A process of the determining is specifically shown in FIG. 2 according to this embodiment of the present disclosure, and includes:

Step S201: Determine a characteristic vector of each application program in an application program database corresponding to the multi-core processor, where the characteristic vector represents an occupancy rate of each shared resource in the multi-core processor occupied by each application program when the application program is running alone in the multi-core processor.

The application program database corresponding to the multi-core processor includes a large quantity of application programs, and these application programs may cover all types of programs that can run in the multi-core processor.

The characteristic vector, for each shared resource, of each application program when the application program is running alone in the multi-core processor is obtained by running each application program, in the application program database, alone in the multi-core processor. The characteristic vector may represent an occupancy rate of each shared resource in the multi-core processor occupied by each application program when the application program is running alone in the multi-core processor.

In this embodiment of the present disclosure, an occupancy rate of a shared resource occupied by a program needs to be quantized. For example, use of a shared cache by the program may be represented by data moved by the program from the shared cache to a private cache per second; and use of memory bandwidth by the program may be represented by data loaded from a memory to a cache per second.

In this embodiment of the present disclosure, an occupancy rate of a shared resource is represented by using a characteristic vector of a program when the program is running alone in the multi-core processor; the characteristic vector of a program refers to an occupancy rate of different shared resources occupied by the program, and is represented as PA=<PA1, PA2 . . . PAi . . . PAk>, where k is a quantity of shared resources in the multi-core processor, and PAi represents an occupancy rate of shared resource i occupied by program A.

Step S202: Classify application programs whose occupancy rates are in a same preset occupancy rate interval into a same characteristic group.

In this embodiment of the present disclosure, a k-dimensional characteristic space is defined, where k is a quantity of shared resources in the multi-core processor. Each application program is mapped to the k-dimensional characteristic space according to the characteristic vector of the application program.

A specific implementation may be as follows: For any shared resource i in the multi-core processor, a characteristic interval corresponding to the shared resource i is divided into N sub-intervals. Therefore, the entire k-dimensional characteristic space is divided into N1*N2* . . . *Nk characteristic groups, and behavior characteristics of all application programs whose characteristic vectors fall within a same characteristic group are similar.

A characteristic interval of a shared resource is an operation capability of the shared resource. For example, a characteristic interval of a shared cache is an interval of a volume of data that can be cached by the shared cache, and a characteristic interval of memory bandwidth is a size of memory bandwidth.

For any two programs A and B in the sample program set, if data moved by A from a shared cache to a private cache is 0.5 per second, and data moved by B from the shared cache to a private cache is 0.4 per second, an overall characteristic interval of the shared cache is 0.1-1.0. The characteristic interval of the shared cache is divided into three sub-intervals, which are respectively 0.1-0.3, 0.3-0.6, and 0.6-1.0. Then, A and B fall within the sub-interval 0.3-0.6; therefore it is considered that characteristics of programs A and B are similar, namely programs A and B are programs in a same characteristic group.

A characteristic interval of a single shared resource is used as an example in the foregoing. In this embodiment of the present disclosure, characteristic intervals of multiple shared resources may further be defined. For example, a characteristic interval of a shared cache and a characteristic interval of memory bandwidth may be separately divided, and programs that simultaneously fall within a same shared cache sub-interval and a same memory bandwidth sub-interval are considered as programs with similar characteristics.

Step S203: Randomly select one application program from each characteristic group as a sample program to form the sample program set.

In this embodiment of the present disclosure, all programs included in the set of selected sample training programs reflect behavior characteristics of all programs that can run in the multi-core processor. Therefore, a coverage range is wide, which provides abundant samples for obtaining an accurate interference model in subsequent steps.

Step S102: Extract multiple subsets from the sample program set according to a preset extraction rule, where union of the subsets is the sample program set;

To acquire abundant training program data, in this embodiment of the present disclosure, training programs are selected from the set of sample training programs according to a preset selection rule, to form the multiple subsets.

In this embodiment of the present disclosure, a specific process of extracting the multiple subsets is as follows:

separately using each sample program in the sample program set as a target sample program; and extracting, from the sample program set, Q different subsets that include the target sample programs, where each subset includes N sample programs in total;

where:

N is a quantity of processor cores integrated in the multi-core processor; and $1 \leq Q \leq C_{M-1}^{N-1}$, where Q is an integer, and M is a quantity of sample programs in the sample program set.

In this embodiment of the present disclosure, multiple subsets are extracted from the sample program set, all programs included in the subsets need to cover all programs in the sample program set, and any program in the sample program set needs to appear in at least Q subsets in the multiple subsets. In this embodiment of the present disclosure, preferably, any selected program appears in the at least Q subsets.

It is assumed that there is a sample program set <a,b,c,d,e>, and the multi-core processor includes three cores; therefore, three programs need to be selected each time. Assuming that a value of Q is 3, a preferable selection scheme may be as follows:

<a,b,c>,<a,c,d>,<a,d,e>,

<b,c,d>,<b,c,e>,<b,d,e>,

In the foregoing multiple subsets, each of programs a, b, c, d, and e appears three times, and the foregoing six subsets can meet the selection requirement.

In this embodiment of the present disclosure, <a,b,c> may be considered as a subset in which each of programs a, b, or c appears once.

In the foregoing example, a maximum range of a value of Q is 1-6.

In this embodiment of the present disclosure, the value of Q is a constant that is determined according to a quantity of cores, a processing capacity, and a processing rate of the multi-core processor, an interference interval between the training programs, and a specified function form.

Step S103: Acquire a value of performance interference imposed on each sample program in each subset when the sample program is running in the multi-core processor, and a total occupancy rate of a shared resource in the multi-core processor occupied by all the sample programs in each subset.

In this embodiment of the present disclosure, after sufficient subsets are selected, a process of acquiring the value of performance interference imposed on each training program in each subset when the training program is running in the multi-core processor is to continuously run each training program in each subset in the multi-core processor until each training program is executed at least once under interference from another training program.

During the running process, the value of performance interference imposed on each training program when the training program is running together with another training program in a same subset as the training program is obtained.

In this embodiment of the present disclosure, when the training program in each subset is run continuously, statistics of inter-core performance interference imposed on each training program are collected in real time.

In this embodiment of the present disclosure, to acquire an abstract function model of each training program in the multi-core processor, a function type set, an aggregation mode set, and a segmentation condition set are set for the abstract function model; for each training program in the set of sample training programs, a regression analysis is performed by using each function type in the function type set and training set data that is processed by using different aggregate segmentation conditions; finally, a function type and an aggregate segmentation condition that have the optimal average fitting effect and that are suitable for all the training programs are obtained, where the function type is used as an abstract function type on the multi-core processor, and the corresponding aggregate segmentation condition is used as an aggregation mode and a segmentation condition on the multi-core processor.

During a process of acquiring the total occupancy rate of a shared resource in the multi-core processor occupied by all the sample programs in each subset, an occupancy rate of the shared resource by each sample program needs to be aggregated.

Aggregation is to aggregate occupancy rates of a same shared resource occupied by all the sample programs in each subset.

In this embodiment of the present application, an aggregation process includes two processes: pre-processing, and performing aggregation according to different modes.

First, pre-processing is to process a characteristic vector of a training program in each subset, and map an original characteristic vector value corresponding to each training program to a new value.

Common pre-processing types include exp (exponent), log (logarithm), pow (power function), none, and the like. If a pre-processing type is none, a new value obtained by means of mapping is equal to an original value.

It is assumed that a characteristic vector of a training program A is PA=<PA1, PA2 ... PAi ... PAk>. After pre-preprocessing by using exp, a characteristic vector corresponding to training program A becomes <exp(PA1),exp (PA2) ... exp(PAi) ... exp(PAk)>.

Second, occupancy rates of a same shared resource in the multi-core processor occupied by all the training programs in each subset are aggregated according to an aggregation mode in the aggregation mode set.

In this embodiment of the present disclosure, an aggregation mode in the aggregation mode set may be add or mul.

For example, a subset includes four programs A, B, C, and D; PA, PB, PC, and PD are respective pressure values corresponding to the programs A, B, C, and D. It is assumed that a pre-processing type is none. A result of aggregation in add mode is Aggregate(Pi)=PAi+PBi+PCi+PDi.

A result of aggregation in mul mode is Aggregate(Pi)= PAi*PBi*PCi*PDi.

In this embodiment of the present disclosure, a pre-processing type and an aggregation mode are specified in a configuration file.

For any data point at which training programs are centralized, characteristic vectors of all programs in a corresponding subset are aggregated. Assuming that a total pressure, after aggregation, of subset j corresponding to training program A is PA, j=Aggregate (Pi)j, (i=1, 2, ..., k), a data point becomes the following form: <A, PA, j, PDA, Wj>, where A represents program A; PA, j represents a total occupancy rate of a shared resource occupied by a subset, after aggregation, in which A is located; PDA represents a value of interference imposed on A in the subset; and Wj represents the subset in which A is located.

In this embodiment of the present disclosure, for quantization of inter-core performance interference, a change value such as a change of training program execution time, a change of IPC (inter-process communication), a change of a throughput rate of a training program, or a change of QoS of a program may be used as a quantization standard.

For training program A, a value of performance interference imposed on training program A when training program A is running together with another training program is obtained from each subset in which training program A is located, and the value of performance interference is represented as <A, WA, j, PDA, Wj>, where A represents training program A; WA, j represents subset j that includes A; and PDA, Wj represents performance reduction of program A in subset j that includes A, namely a value of performance interference imposed on program A.

In this embodiment of the present disclosure, after a value of performance interference on each program in a subset and a total occupancy rate of a shared resource occupied by all programs in each subset are obtained, a data point corresponding to the value of performance interference and the total occupancy rate may be obtained. For example, for a subset <a,b,c>, after the programs in the subset run under performance interference, a value of performance interference imposed on a is P1, a value of performance interference imposed on b is P2, and a value of performance interference imposed on c is P3; and a total occupancy rate of a shared resource occupied by a, b, and c is F. Then, data points <P1,F>, <P2,F>, and <P3,F> can be obtained. For program a, at least Q data points exist. A data point corresponding to a value of performance interference and a total occupancy rate is used as training set data for performing a regression analysis.

Step S104: Divide all the subsets into multiple analytical units, where each analytical unit includes multiple subsets.

Figure 3:
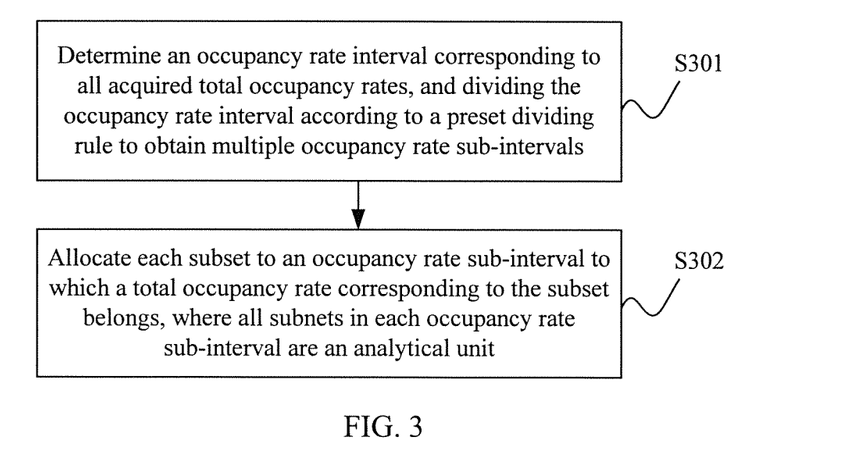
FIG. 3 is a specific method flowchart of a method for determining a program performance interference model according to an embodiment of the present disclosure.

In this embodiment of the present disclosure, after data of multiple training sets is determined, all the subsets are divided so as to better meet a running condition of the multi-core processor. A specific dividing process is shown in FIG. 3 in this embodiment of the present disclosure, and includes:

Step S301: Determine an occupancy rate interval corresponding to all the acquired total occupancy rates, and dividing the occupancy rate interval according to a preset dividing rule to obtain multiple occupancy rate sub-intervals.

Step S302: Allocate each subset to an occupancy rate sub-interval to which a total occupancy rate corresponding to the subset belongs, where all subsets in each occupancy rate sub-interval are considered as an analytical unit.

In this embodiment of the present disclosure, a total occupancy rate of any shared resource is practically meaningful. For example, for shared bandwidth, a multi-core processor running platform limits a maximum bandwidth value of the shared bandwidth. Therefore, an occupancy rate interval corresponding to a shared resource is determined according to an actual operation capability of the shared resource, and the occupancy rate interval corresponding to the shared resource is a continuous interval.

It is assumed that a sample program set is divided into four subsets, and a multi-core processor has three shared resources in total; in a first subset, a total occupancy rate of a first shared resource occupied by all programs is X1, a total occupancy rate of a second shared resource is Y1, and a total occupancy rate of a third shard resource is Z1;

in a second subset, a total occupancy rate of the first shared resource occupied by all programs is X2, a total occupancy rate of the second shared resource is Y2, and a total occupancy rate of the third shard resource is Z2;

in a third subset, a total occupancy rate of the first shared resource occupied by all programs is X3, a total occupancy rate of the second shared resource is Y3, and a total occupancy rate of the third shard resource is Z3; and in a fourth subset, a total occupancy rate of the first shared resource occupied by all programs is X4, a total occupancy rate of the second shared resource is Y4, and a total occupancy rate of the third shard resource is Z4.

Then, by using the first shared resource as an example, aggregated total occupancy rate data of the first shared resource occupied by the subsets include (X1, X2, X3, X4); it is assumed that $X1<X2<X3<X4$.

If an occupancy rate interval of the first shared resource is a continuous interval (m,n), where $m<X1$, and $n>X4$;

point q is selected as a demarcation point for segmenting the occupancy rate interval of the first shared resource in a segmentation set, where $X2<q<X3$; and the occupancy rate interval of the first shared resource is divided into (m,q) and (q,n). Correspondingly, the first subset and second subset are allocated to the interval (m,q), and the third subset and the fourth subset are allocated to the interval (q,n).

The first subset and the second subset form an analytical unit, and the third subset and the fourth subset form another analytical unit.

Step S105: Perform a regression analysis, according to multiple function models in a preset function library, on the value of performance interference on each sample program included in each analytical unit and a total occupancy rate corresponding to a subset in which the sample program is located, so as to obtain a function model corresponding to each sample program; and acquire a target function model from the obtained function models corresponding to the sample programs.

In this embodiment of the present disclosure, a value of performance interference imposed on a sample program and a total occupancy rate corresponding to a subset in which the sample program is located are divided into different analytical units for performing a regression analysis.

A process of the regression analysis is a process in which a relationship between two different variables is determined, some corresponding values of the two variables are obtained, and, after a function form is assumed, all coefficients of the function are obtained.

In this embodiment of the present disclosure, after several research and development tests, the inventors have found that a function relationship exists between a value of performance interference imposed on a program during a running process and a total occupancy rate of a shared resource. After selecting multiple sample programs, and extracting multiple subsets by using the sample programs, the inventors acquire values of performance interference of programs in each subset and an aggregated total occupancy rate of a shared resource occupied by each subset, so as to obtain the foregoing data points <P1,F>, <P2,F>, and <P3,F>. These data points can be used as training set data for performing a regression analysis.

In the preset function library, function models are selected in sequence, and separately used with selected training set data to perform a regression analysis, so as to determine coefficients of each function model. After the coefficients of each function model are determined, goodness-of-fit of each specific function model relative to the selected training set data is calculated, where goodness-of-fit refers to a degree of fitting of a regression function to an observed value.

In this embodiment of the present disclosure, multiple regression analyses are performed on any sample program in each analytical unit to obtain a function model with optimal goodness-of-fit for the program, and then degrees of fitting of the function models of all the programs are averaged to obtain a function model of all the programs.

It can be seen from the foregoing process that, in this embodiment of the present disclosure, after aggregation of total occupancy rates of a shared resource is completed, subsets are allocated to intervals according to total occupancy rate values of a shared resource in the multi-core processor.

In this embodiment of the present disclosure, subsets are allocated to different intervals by setting a allocation condition. For example, a characteristic of a shared resource in a multi-core processor is divided into three intervals, and each subset is allocated to an interval corresponding to the subset according to an aggregated total occupancy rate of the shared resource occupied by each subset. After the subsets are allocated to different intervals, a value of performance interference imposed on a training program in each subnet remains unchanged; however, these values of performance interference are allocated to different pressure intervals accordingly after the subsets are allocated to the intervals. A condition for allocating a subset in this embodiment of the present disclosure may be configured by a corresponding configuration file.

In this embodiment of the present disclosure, a function type that may be used for performing a regression analysis may be specified in a configuration file, and may be, for example, an exponential function type or a polynomial function type.

It is assumed that: only impacts of a shared cache and shared bandwidth in shared resources are considered; a function type after the regression analysis is an abstract function type in a preset function set; aggregation is as follows: a pre-processing type is none, and an aggregation mode is add; and a segmentation condition is that an aggregated total occupancy rate of shared bandwidth is divided into three sub-intervals. Then, a model of performance interference imposed on any program A in a sub-interval determined according to a bandwidth-based segmentation condition may be represented as:

PDA=a1*Aggregate(Pcache)+a2*Aggregate(Pbw)+CA,
where PDA represents the performance interference imposed on the program; Aggregate(Pcache) and Aggregate(Pbw) represent total pressures obtained after an aggregation is performed on a shared cache and shared bandwidth by using the pre-processing type none and the aggregation mode add; and a1, a2, and CA are coefficients of a function corresponding to program A, where PDA=a1*Aggregate(Pcache)+a2*Aggregate(Pbw)+CA
is a target function model for all the sample programs.

Step S106: Determine a performance interference model corresponding to a target program according to the target function model, where the target program is any program running in the multi-core processor.

The steps S101 to S105 described in the foregoing belong to the first implementation stage of the method for determining a performance interference model according to this embodiment of the present disclosure, and a main purpose is to obtain a target function model for each training program.

A form of the target function model is definite; however, for different programs, a coefficient of each independent variable in a fitting function is not indefinite.

Therefore, to obtain a performance interference model for each the sample program, the second implementation stage of the method for determining a performance interference model according to this embodiment of the present disclosure also needs to be executed, so as to determine coefficients of target function models corresponding to different programs.

Figure 4:
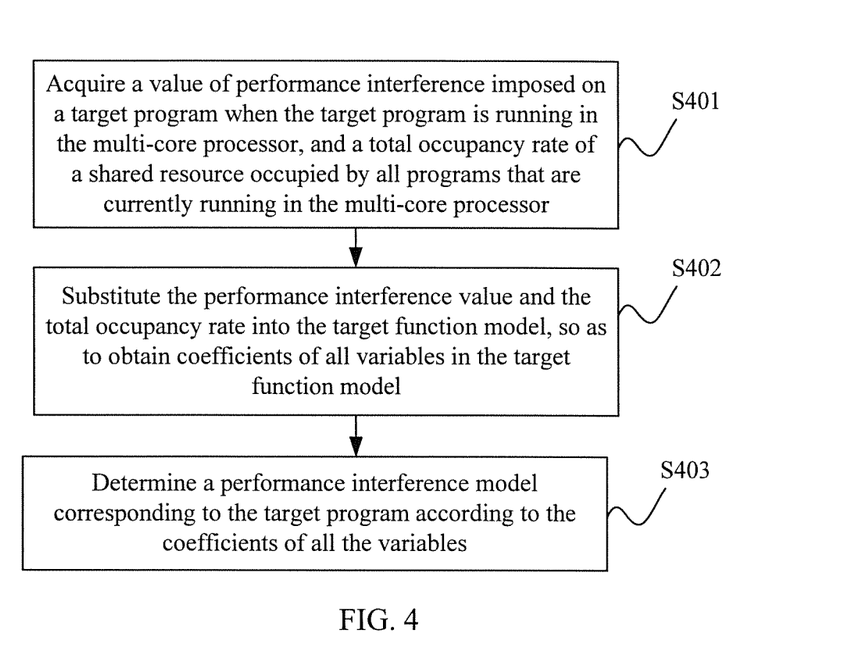
FIG. 4 is a specific method flowchart of a method for determining a program performance interference model according to an embodiment of the present disclosure.

Step S106 is the second implementation stage for determining a performance interference model in this embodiment of the present disclosure. A specific implementation is shown in FIG. 4 in this embodiment of the present disclosure, and includes:

Step S401: Acquire a value of performance interference imposed on the target program when the target program is running in the multi-core processor, and a total occupancy rate of a shared resource occupied by all programs that are currently running in the multi-core processor.

Step S402: Substitute the value of performance interference on the target program and the total occupancy rate of the shared resource occupied by all the programs that are currently running in the multi-core processor into the target function model, so as to obtain coefficients of all variables in the target function model.

Step S403: Determine the performance interference model corresponding to the target program according to the coefficients of all the variables.

It can be learned from the foregoing description that, the second implementation stage according to this embodiment of the present disclosure is to instantiate, on a corresponding multi-core processor platform according to an abstract function model, coefficients of an overall optimal fitting function corresponding to any program A, for example, the foregoing a1, a2, and CA.

For any program A that is running in a multi-core processor, whether A belongs to the sample program set in step S101 is first determined. If A belongs to the sample program set, during a process of obtaining a target function model, a specific function model corresponding to program A is already determined and can be directly invoked for obtaining the performance interference model.

If program A is not in the sample program set, steps S401 to S403 need to be executed to determine different subsets for program A, obtain a value of performance interference on program A in each subset and a total occupancy rate of a shared resource occupied by each subset, obtain training set data of program A, and substitute the data of each training set into the target function model to determine a coefficient of the target function model, so as to obtain a performance interference model corresponding to program A.

The value of performance interference acquired in this embodiment of the present disclosure may be a performance change of program A in different subsets, where the performance change may be a change of execution time, IPC, or QoS.

In this embodiment of the present disclosure, during an execution process of the second stage, because a relatively small quantity of subsets are selected for program A, this process can be completed within constant time.

By using the method for determining a program performance interference model according to this embodiment of the present disclosure, a performance interference model can be provided for each program running in a multi-core processor, and performance interference imposed, by another program, on each program running in the multi-core processor can be quantized, thereby providing a scheduling basis for preventing programs whose mutual interference is relatively strong from running in a same multi-core processor, and ensuring optimal performance of a program when the program is running in the multi-core processor.

For example, when a program with a relatively high priority is running in a multi-core processor, programs that have relatively high performance interference on the program when running together with the program can be determined according to a performance interference model corresponding to the program, so as to prevent these programs from running together with the program. Some programs that have relatively low performance interference on the program may be scheduled to run together with the program, thereby improving a resource utilization rate of the multi-core processor.

More specifically, a multi-core processor is disposed in a multi-functional mobile phone. After a user opens multiple programs, the programs may continue running in the background of the mobile phone. When the user starts a program, according to the performance interference model provided and determined in this embodiment of the present disclosure, the user may be informed of a program that is running in the background and that may have relatively high performance interference on the program when running together with the current program that needs to be started, so that the user may close the related program that is running in the background, to ensure normal startup of the program that needs to be started and stable performance of the program during a running process.

Figure 5:
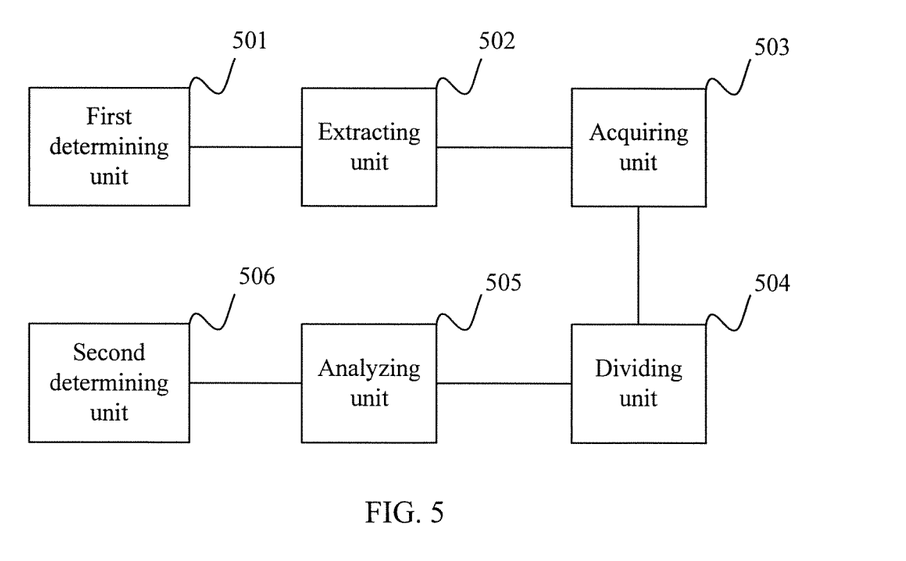
FIG. 5 is a schematic structural diagram of a device for determining a program performance interference model according to an embodiment of the present disclosure.

Corresponding to the foregoing method, to provide a specific implementation platform for implementing the foregoing method, an embodiment of the present disclosure further provides a device for determining a program performance interference model. The determining device may be applied to any multi-core processor. A schematic structural diagram of the device is shown in FIG. 5. The device includes:

a first determining unit 501, configured to determine a sample program set, where the sample program set includes multiple sample programs used for sample training;

an extracting unit 502, configured to extract multiple subsets from the sample program set according to a preset extraction rule, where union of the multiple subsets is the sample program set;

an acquiring unit 503, configured to acquire a value of performance interference imposed on each sample program in each subset when the sample program is running in the multi-core processor, and a total occupancy rate of a shared resource in the multi-core processor occupied by all the sample programs in each subset;

a dividing unit 504, configured to divide all the subsets into multiple analytical units, where each analytical unit includes multiple subsets;

an analyzing unit 505, configured to perform a regression analysis, according to multiple function models in a preset function library, on the value of performance interference on each sample program included in each analytical unit and a total occupancy rate corresponding to a subset in which the sample program is located, so as to obtain a function model corresponding to each sample program; and acquire a target function model from the obtained function models corresponding to all the sample programs; and a second determining unit 506, configured to determine a performance interference model corresponding to a target program according to the target function model, where the target program is any program running in the multi-core processor.

Figure 6:
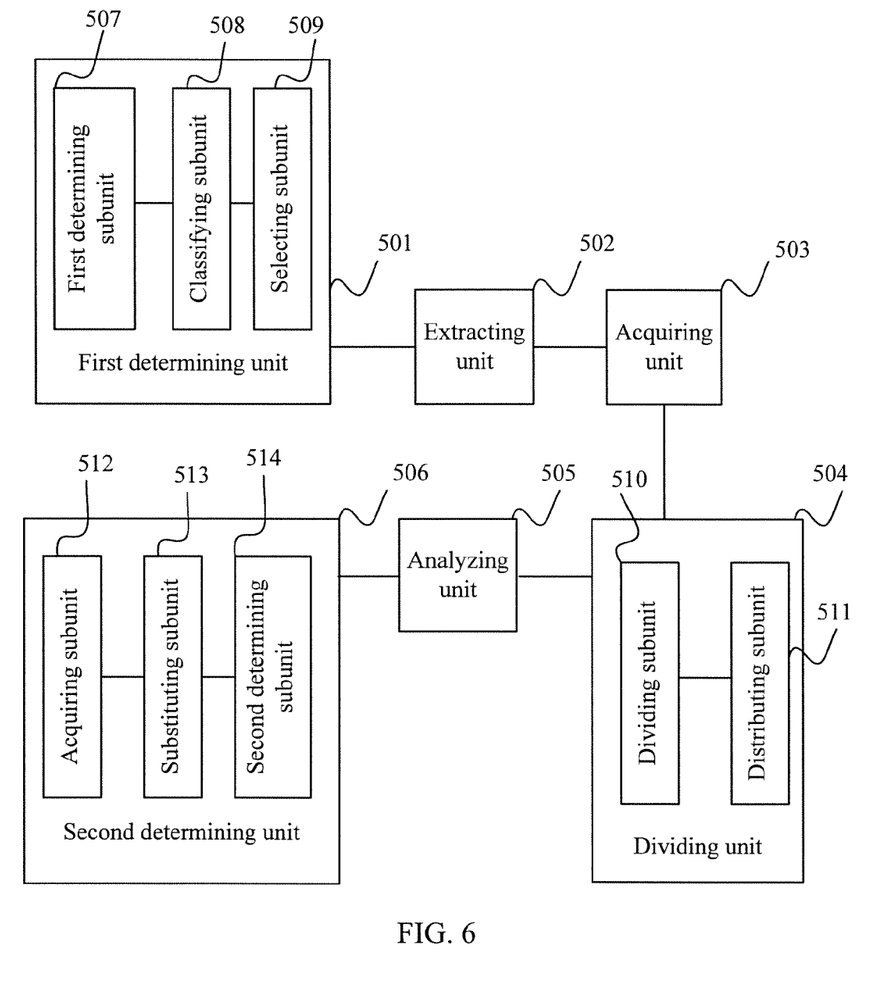
FIG. 6 is a detailed schematic structural diagram of a device for determining a program performance interference model according to an embodiment of the present disclosure.

FIG. 6 is a detailed schematic structural diagram of a device for determining a program performance interference model according to an embodiment of the present disclosure. Based on the structure shown in FIG. 5, the following describes in detail the structure of the device in FIG. 5.

The first determining unit 501 includes:

a first determining subunit 507, configured to determine a characteristic vector of each application program in an application program database corresponding to the multi-core processor, where the characteristic vector represents an occupancy rate of each shared resource in the multi-core processor occupied by the application program when the application program is running alone in the multi-core processor;

a classifying subunit 508, configured to classify application programs whose occupancy rates are in a same preset occupancy rate interval into a same characteristic group; and a selecting subunit 509, configured to randomly select one application program from each characteristic group as a sample program to form a sample program set.

The dividing unit 504 includes:

a dividing subunit 510, configured to determine an occupancy rate interval corresponding to all the acquired total occupancies, and divide the occupancy rate interval according to a preset dividing rule to obtain multiple occupancy rate sub-intervals; and an allocating subunit 511, configured to allocate each subset to an occupancy rate sub-interval to which a total occupancy rate corresponding to the subset belongs, where all subsets in each occupancy rate sub-interval are considered as an analytical unit.

The second determining unit 506 includes:

an acquiring subunit 512, configured to acquire a value of performance interference imposed on the target program when the target program is running in the multi-core processor, and a total occupancy rate of a shared resource occupied by all programs that are currently running in the multi-core processor;

a substituting subunit 513, configured to substitute the value of performance interference and the total occupancy rate into the target function model to obtain coefficients of all variables in the target function model; and a second determining subunit 514, configured to determine the value of performance interference corresponding to the target program according to the coefficients of all the variables.

The device for determining a program performance interference model according to this embodiment of the present disclosure can determine, for all programs running in a multi-core processor, a performance interference model corresponding to each program, so that when any program and another program are running together in the multi-core processor, performance interference imposed on the program by the another program can be quantized. This may prevent programs whose mutual interference is relatively strong from running in a same multi-core processor, and provides an instruction for mutual scheduling between programs that may run together, thereby improving a resource utilization rate of the multi-core processor.

Figure 7:
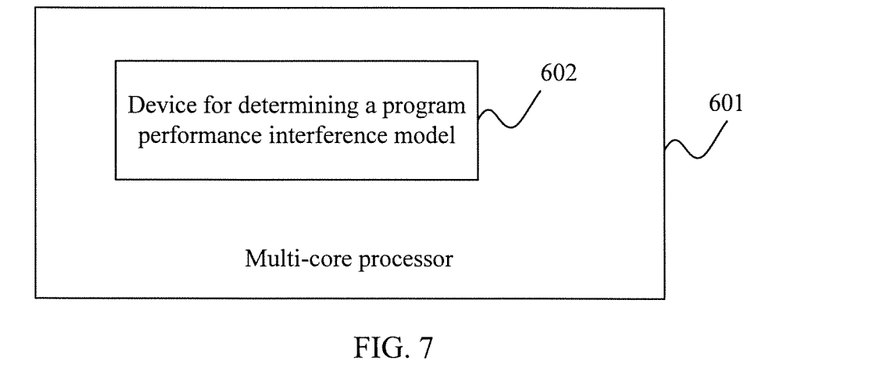
FIG. 7 is a schematic structural diagram of a multi-core processor according to an embodiment of the present disclosure.

An embodiment of the present disclosure further provides a multi-core processor. A schematic structural diagram of the multi-core processor is shown in FIG. 7 in this embodiment of the present disclosure. A device 602 for determining a program performance interference model is disposed in a multi-core processor 601.

The device 602 includes a first determining unit, an extracting unit, an acquiring unit, a dividing unit, an analyzing unit, and a second determining unit. For details about structures and functions of the first determining unit, the extracting unit, the acquiring unit, the dividing unit, the analyzing unit, and the second determining unit, reference may be made to the embodiments described in the foregoing FIG. 5 and FIG. 6, and details are not described herein again.

Figure 8:
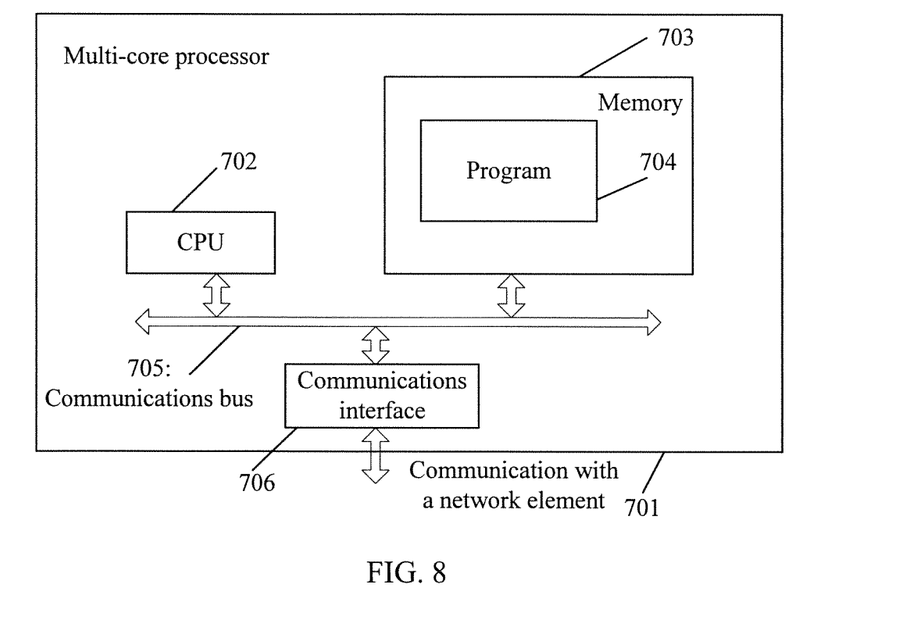
FIG. 8 is a schematic structural diagram of another multi-core processor according to an embodiment of the present disclosure.

FIG. 8 is a schematic structural diagram of another multi-core processor according to an embodiment of the present disclosure. As shown in FIG. 8, the multi-core processor 701 may include:

a CPU 702, a communications interface 706, a memory 703, and a communication bus 705.

The CPU 702, the communications interface 706, and the memory 703 communicate with each other by using the communication bus 705.

The communications interface 706 is configured to communicate with a network element, for example, a network server.

The CPU 702 is configured to execute a program 704. Specifically, the CPU 702 can execute related steps in the method embodiments shown in the foregoing FIG. 1 to FIG. 5.

Specifically, the program 704 may include program code, where the program code includes a computer operating instruction.

The memory 703 is configured to store the program 704. The memory 703 may include a high speed RAM memory, and may further include a non-volatile memory, for example, at least one magnetic disk memory. The program 704 may specifically include:

a first determining unit, an extracting unit, an acquiring unit, a dividing unit, an analyzing unit, and a second determining unit. For details about structures and functions of the first determining unit, the extracting unit, the acquiring unit, the dividing unit, the analyzing unit, and the second determining unit, reference may be made to the embodiments described in the foregoing FIG. 5 and FIG. 6, and details are not described herein again.

It may be clearly understood by persons skilled in the art that, for the purpose of convenient and brief description, for a detailed working process of the foregoing device and module, reference may be made to a corresponding process in the foregoing method embodiments, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented by using some communication interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be allocated on a plurality of network units. A part or all of the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for determining a program performance interference model for use with a multi-core processor, the method comprising:

determining a sample program set comprising multiple sample programs for sample training, comprising:
 determining a characteristic vector of each application program in an application program database corresponding to the multi-core processor, wherein the characteristic vector represents an occupancy rate of each shared resource occupied by the application program when the application program is running alone in the multi-core processor,
 classifying application programs whose occupancy rates are in a same preset occupancy rate interval into a same characteristic group, and
 randomly selecting one application program from each characteristic group as a sample program to form the sample program set;

extracting multiple subsets from the sample program set according to a preset extraction rule, wherein union of the multiple subsets comprises the sample program set;

acquiring a value of performance interference imposed on each sample program in each subset when the sample program is running in the multi-core processor, and a total occupancy rate of a shared resource of the multi-core processor occupied by all the sample programs in each subset;

dividing all the subsets into multiple analytical units, wherein each analytical unit comprises multiple subsets;

performing a regression analysis, according to multiple function models in a preset function library, on the value of performance interference on each sample program comprised in each analytical unit and a total occupancy rate corresponding to a subset in which the sample program is located, so as to obtain a function model corresponding to each sample program;

acquiring a target function model from the obtained function models corresponding to all the sample programs; and determining a performance interference model corresponding to a target program according to the target function model, wherein the target program is any program running in the multi-core processor.

2. The method according to claim 1, wherein extracting multiple subsets from the sample program set according to a preset extraction rule comprises:

separately using each sample program in the sample program set as a target sample program; and extracting, from the sample program set, Q different subsets that comprise the target sample programs, wherein each subset comprises N sample programs in total, wherein N is a quantity of processor cores integrated in the multi-core processor, $2 \leq Q \leq C_{M-1}^{N-1}$, Q is an integer, and M is a quantity of sample programs in the sample program set.

3. The method according to claim 1, wherein dividing all the subsets into multiple analytical units comprises:

determining an occupancy rate interval corresponding to all of the acquired total occupancy rates, and dividing the occupancy rate interval according to a preset dividing rule to obtain multiple occupancy rate sub-intervals; and allocating each subset to an occupancy rate sub-interval to which a total occupancy rate corresponding to the subset belongs, wherein all subsets in each occupancy rate sub-interval are considered as an analytical unit.

4. The method according to claim 1, wherein determining a performance interference model corresponding to a target program according to the target function model comprises:

acquiring a value of performance interference imposed on the target program when the target program is running in the multi-core processor, and a total occupancy rate of a shared resource occupied by all programs that are currently running in the multi-core processor;

substituting the value of performance interference on the target program and the total occupancy rate of the shared resource occupied by all the programs that are currently running in the multi-core processor into the target function model, so as to obtain coefficients of all variables in the target function model; and determining the performance interference model corresponding to the target program according to the coefficients of all the variables.

5. A device for determining a program performance interference model, the device comprising:

a processor and a memory, the memory having a plurality of instructions stored thereon, that when executed by the processor, cause the processor to:

determine a sample program set, wherein the sample program set comprises multiple sample programs for sample training;

extract multiple subsets from the sample program set according to a preset extraction rule, wherein union of the multiple subsets comprises the sample program set;

acquire a value of performance interference imposed on each sample program in each subset when the sample program is running in a multi-core processor, and a total occupancy rate of a shared resource of the multi-core processor occupied by all the sample programs in each subset;

divide all the subsets into multiple analytical units, wherein each analytical unit comprises multiple subsets;

perform a regression analysis, according to multiple function models in a preset function library, on the value of performance interference on each sample program comprised in each analytical unit and a total occupancy rate corresponding to a subset in which the sample program is located, so as to obtain a function model corresponding to each sample program;

acquire a target function model from the obtained function models corresponding to all the sample programs;

determine a performance interference model corresponding to a target program according to the target function model, wherein the target program is any program running in the multi-core processor; and wherein to determine the sample program set, the instructions cause the processor to:

determine a characteristic vector of each application program in an application program database corresponding to the multi-core processor, wherein the characteristic vector represents an occupancy rate of each shared resource occupied by the application program when the application program is running alone in the multi-core processor, classify application programs whose occupancy rates are in a same preset occupancy rate interval into a same characteristic group, and randomly select one application program from each characteristic group as a sample program to form a sample program set.

6. The device according to claim 5, wherein the instructions further cause the processor to:

determine an occupancy rate interval corresponding to all of the acquired total occupancy rates, and divide the occupancy rate interval according to a preset dividing rule to obtain multiple occupancy rate sub-intervals; and allocate each subset to an occupancy rate sub-interval to which a total occupancy rate corresponding to the subset belongs, wherein all subsets in each occupancy rate sub-interval are considered as an analytical unit.

7. The device according to claim 5, wherein the instructions further cause the processor to:

acquire a value of performance interference imposed on the target program when the target program is running in the multi-core processor, and a total occupancy rate of a shared resource occupied by all programs that are currently running in the multi-core processor;

substitute the value of performance interference on the target program and the total occupancy rate of the shared resource occupied by all the programs that are running in the multi-core processor into the target function model to obtain coefficients of all variables in the target function model; and determine the performance interference model corresponding to the target program according to the coefficients of all the variables.

8. The device according to claim 5, wherein the instructions further cause the processor to:

separately use each sample program in the sample program set as a target sample program; and extract, from the sample program set, Q different subsets that comprise the target sample programs, wherein each subset comprises N sample programs in total, and wherein N is a quantity of processor cores integrated in the multi-core processor, $2 \leq Q \leq C_{M-1}^{N-1}$, Q is an integer, and M is a quantity of sample programs in the sample program set.

9. A computer program product, comprising:

a non-transitory computer-readable medium storing computer executable instructions that when executed by a processor instruct the processor to:
- determine a sample program set, wherein the sample program set comprises multiple sample programs for sample training;
- extract multiple subsets from the sample program set according to a preset extraction rule, wherein union of the multiple subsets comprises the sample program set;
- acquire a value of performance interference imposed on each sample program in each subset when the sample program is running in a multi-core processor, and a total occupancy rate of a shared resource of the multi-core processor occupied by all the sample programs in each subset;
- divide all the subsets into multiple analytical units, wherein each analytical unit comprises multiple subsets;
- perform a regression analysis, according to multiple function models in a preset function library, on the value of performance interference on each sample program comprised in each analytical unit and a total occupancy rate corresponding to a subset in which the sample program is located, so as to obtain a function model corresponding to each sample program;
- acquire a target function model from the obtained function models corresponding to all the sample programs;
- determine a performance interference model corresponding to a target program according to the target function model, wherein the target program is any program running in the multi-core processor; and wherein to determine the sample program set, the instructions instruct the processor to:
- determine a characteristic vector of each application program in an application program database corresponding to the multi-core processor, wherein the characteristic vector represents an occupancy rate of each shared resource occupied by the application program when the application program is running alone in the multi-core processor,
- classify application programs whose occupancy rates are in a same preset occupancy rate interval into a same characteristic group, and
- randomly select one application program from each characteristic group as a sample program to form a sample program set.

10. The computer program product according to claim 9, wherein the instructions further cause the processor to:
- determine an occupancy rate interval corresponding to all the acquired total occupancy rates, and divide the occupancy rate interval according to a preset dividing rule to obtain multiple occupancy rate sub-intervals; and
- allocate each subset to an occupancy rate sub-interval to which a total occupancy rate corresponding to the subset belongs, wherein all subsets in each occupancy rate sub-interval are considered as an analytical unit.

11. The computer program product according to claim 9, wherein the instructions further cause the processor to:
- acquire a value of performance interference imposed on the target program when the target program is running in the multi-core processor, and a total occupancy rate of a shared resource occupied by all programs that are currently running in the multi-core processor;
- substitute the value of performance interference on the target program and the total occupancy rate of the shared resource occupied by all the programs that are running in the multi-core processor into the target function model to obtain coefficients of all variables in the target function model; and
- determine the performance interference model corresponding to the target program according to the coefficients of all the variables.

12. The computer program product according to claim 9, wherein the instructions further cause the processor to:
- separately use each sample program in the sample program set as a target sample program; and
- extract, from the sample program set, Q different subsets that comprise the target sample programs, wherein each subset comprises N sample programs in total, and wherein N is a quantity of processor cores integrated in the multi-core processor, $2 \leq Q \leq C_{M-1}^{N-1}$, Q is an integer, and M is a quantity of sample programs in the sample program set.

* * * * *